US012754789B2

(12) United States Patent
Hirayama

(10) Patent No.: US 12,754,789 B2
(45) Date of Patent: Oct. 6, 2026

(54) ELECTRONIC CONTROL DEVICE FOR VEHICLE

(71) Applicant: TOYOTA JIDOSHA KABUSHIKI KAISHA, Toyota (JP)

(72) Inventor: Naoya Hirayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/053,596

(22) Filed: Feb. 14, 2025

(65) Prior Publication Data

US 2026/0010444 A1 Jan. 8, 2026

(30) Foreign Application Priority Data

Jul. 4, 2024 (JP) ................................ 2024-108165

(51) Int. Cl.
*G06F 11/07* (2006.01)

(52) U.S. Cl.
CPC ...... *G06F 11/0739* (2013.01); *G06F 11/0751* (2013.01)

(58) Field of Classification Search
CPC ......................... G06F 11/0739; G06F 11/0751
See application file for complete search history.

(56) References Cited

U.S. PATENT DOCUMENTS 8,583,305 B2 * 11/2013 Novak .............. B60W 50/0205 180/65.21
2023/0315307 A1 * 10/2023 Ge ........................ G06F 11/004 711/154

FOREIGN PATENT DOCUMENTS

JP 2016-022842 A 2/2016

OTHER PUBLICATIONS

Yi et al. "Power Saving using Partial Networking in Automotive System." 2015 IEEE International Conference on Information and Automation, pp. 148-152. IEEE, 2015. (Year: 2015).*

* cited by examiner

*Primary Examiner* — Joseph R Kudirka
(74) *Attorney, Agent, or Firm* — SoraIP, Inc.

(57) ABSTRACT

When the power supply state is in the off state and the input voltage is equal to or higher than the prescribed voltage, the electronic control device of the vehicle starts the mask processing when the reception of the wake-up signal by the terminal satisfies the abnormal condition. In the masking process, the execution device does not put the electronic control device in a wake-up state based on the wake-up signal. When the power supply state is turned on after the masking process, the execution device performs a cancellation process of canceling the masking process.

4 Claims, 2 Drawing Sheets

ELECTRONIC CONTROL DEVICE FOR VEHICLE

CROSS-REFERENCE TO RELATED APPLICATION

This application claims priority to Japanese Patent Application No. 2024-108165 filed on Jul. 4, 2024, incorporated herein by reference in its entirety.

BACKGROUND

1. Technical Field

The present disclosure relates to an electronic control device for a vehicle.

2. Description of Related Art

Japanese Unexamined Patent Application Publication No. 2016-22842 (JP 2016-22842 A) describes an electronic control device mounted on a vehicle. The electronic control device includes a terminal capable of receiving a wake-up signal. When the terminal receives a wake-up request, an execution unit of the electronic control device performs a starting process of bringing the state of the electronic control device from a sleep state into a wake-up state.

SUMMARY

In an electronic control device such as that described in JP 2016-22842 A, reception of a wake-up signal by a terminal occasionally satisfies an abnormal condition determined in advance. In response to the wake-up signal from the reception satisfying the abnormal condition, the execution unit occasionally performs a masking process in which the electronic control device is not brought into the wake-up state, depending on the wake-up signal, even if the wake-up signal is received. However, there is a possibility that the state of the electronic control device is continuously not brought into the wake-up state as the execution unit continues the masking process. As a result, the functionality of the electronic control device may continue to be excessively restricted.

An aspect of the present disclosure provides an electronic control device for a vehicle, the electronic control device being mounted on a vehicle and operable by consuming, when a power supply state of the vehicle is an off state, electric power stored in a battery when the power supply state is an on state.

The electronic control device includes a terminal that is able to receive from outside a wake-up signal indicating a request to bring the electronic control device from a sleep state into a wake-up state in which a greater amount of the electric power is consumed than in the sleep state.

The electronic control device further includes an execution unit configured to perform: a starting process of bringing the electronic control device into the wake-up state based on the wake-up signal received by the terminal;

a masking process of not bringing the electronic control device into the wake-up state based on the wake-up signal received by the terminal when the power supply state is the off state and a voltage input to the electronic control device is equal to or more than a prescribed voltage determined in advance, when reception of the wake-up signal by the terminal satisfies an abnormal condition determined in advance; and a canceling process of canceling the masking process when the power supply state is brought from the off state into the on state after the masking process.

According to the above configuration, the execution unit performs the canceling process when the power supply state is brought into the on state after the masking process. Therefore, the masking process is canceled at the timing when the battery starts storing the electric power. Accordingly, even if the state of the electronic control device is brought into the wake-up state based on the wake-up signal, the electronic control device can suppress the electric power stored in the battery being excessively low. As a result, it is possible to suppress the functionality of the electronic control device being excessively restricted due to the continuation of the masking process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an electronic control device for a vehicle will be described with reference to the drawings.

Figure 1:
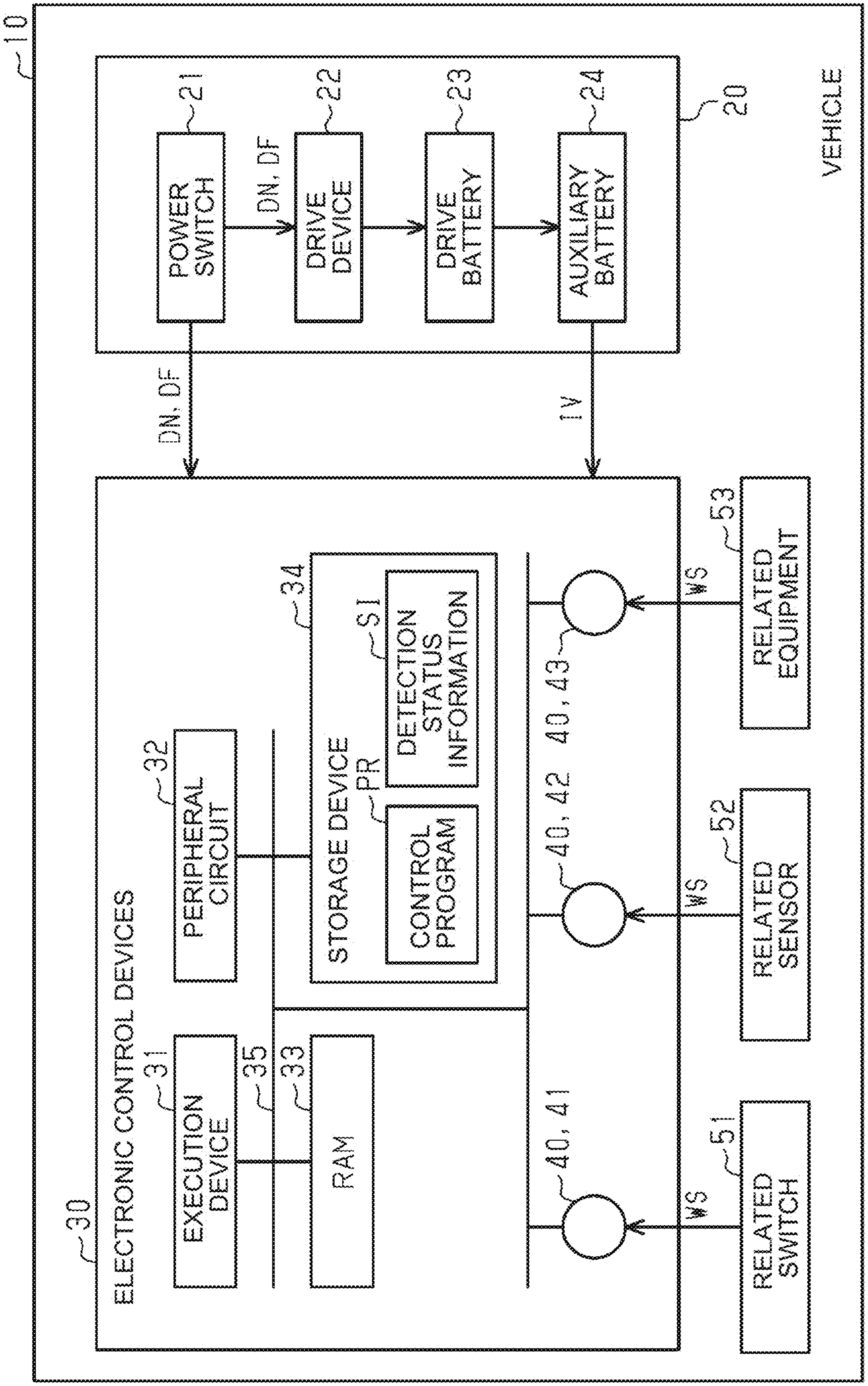
FIG. 1 is a schematic diagram showing vehicles.

First, an outline of the vehicle will be described. As illustrated in FIG. 1, the vehicle 10 includes a power supply system 20 and an electronic control device 30. The power supply system 20 supplies power to the electronic control device 30.

The power supply system 20 includes a power switch 21, a drive device 22, a drive battery 23, and an auxiliary battery 24. The power switch 21 outputs an on-request DN for turning on the power state of the vehicles 10. The power switch 21 outputs an on-request DN to the electronic control device 30. The power switch 21 outputs an on-request DN to the drive device 22. The power switch 21 outputs an off-request DF for turning off the power state of the vehicles 10. The power switch 21 outputs an off-request DF to the electronic control device 30. The power switch 21 outputs an off-request DF to the drive device 22.

The drive device 22 is a device that drives the vehicle 10. The drive device 22 includes an engine and a driving motor. In the present embodiment, the vehicles 10 are hybrid electric vehicle. The drive device 22 stops the driving when the off-request DF is acquired from the power switch 21. When the on-request DN is acquired from the power switch 21, the drive device 22 starts driving. When the drive device 22 is driven, the drive device 22 charges the drive battery 23.

The drive battery 23 is a high-voltage battery for traveling by the vehicle 10. The drive battery 23 supplies electric power to the motor of the drive device 22. The drive battery 23 supplies power to the auxiliary battery 24 via a converter (not shown) when the power state of the vehicle 10 is in the on state.

The auxiliary battery 24 is a secondary battery. The auxiliary battery 24 is a low-voltage battery having a rated voltage lower than that of the drive battery 23. The auxiliary battery 24 stores the electric power supplied from the drive battery 23 when the power state of the vehicle 10 is in the on state. The auxiliary battery 24 supplies power to the electronic control device 30. In the present embodiment, the auxiliary battery 24 is a battery.

The electronic control device 30 is mounted on the vehicle 10. The electronic control device 30 controls, for example, lighting of an indoor light provided on a door of the vehicle 10. Therefore, the electronic control device 30 operates using the electric power supplied from the auxiliary battery 24 even when the power supply state of the vehicle 10 is in the off state.

The electronic control device 30 acquires the on-request DN and the off-request DF from the power switch 21. Further, the electronic control device 30 calculates an input voltage IV which is a voltage input by the electric power supplied from the auxiliary battery 24.

The vehicle 10 includes an associated switch 51, an associated sensor 52, and an associated device 53. The associated switch 51, the associated sensor 52, and the associated device 53 provide a wake-up WS to the electronic control device 30.

The associated switch 51 is a switch associated with the electronic control device 30. The associated switch 51 is, for example, a courtesy switch of a door of the vehicle 10. The courtesy switch detects an open/closed state of a door of the vehicle 10. The associated switch 51 outputs a wake-up signal WS to the electronic control device 30. The wake-up signal WS is a signal indicating a demand for bringing the electronic control device 30 from the sleep state to the wake-up state. The sleep state is a state in which only a minimum predetermined function among the functions that can be realized by the electronic control device 30 is functioning. The minimum function is, for example, a function related to reception of the wake-up signal WS and a process associated therewith. The wake-up state is a state in which the electronic control device 30 can exert a main function. The main function of the electronic control device 30 is to turn on an indoor light provided on a door of the vehicle 10.

The associated sensor 52 is a sensor associated with the electronic control device 30. The associated sensor 52 is, for example, a seating sensor. The seating sensor is disposed in a seat of the driver's seat. Detects that the vehicle is seated in the driver's seat. The associated sensor 52 outputs a wake-up signal WS to the electronic control device 30.

The associated device 53 is a device associated with the electronic control device 30. The related device 53 is, for example, a control device that controls the navigation device and the audio device of the vehicle 10. The related device 53 communicates with the electronic control device 30 according to CAN standards or the like. The associated device 53 outputs a wake-up signal WS to the electronic control device 30.

Electronic Control Devices

The electronic control device 30 includes a plurality of terminals 40. The terminal 40 is capable of receiving a wake-up WS from the outside of the electronic control device 30. The plurality of terminals 40 includes a first terminal 41, a second terminal 42, and a third terminal 43. The first terminal 41 receives the wake-up signal WS from the associated switch 51. The second terminal 42 receives a wake-up signal WS from the associated sensor 52. The third terminal 43 receives the wake-up signal WS from the associated device 53.

The electronic control device 30 includes an execution device 31, which is a CPU, peripheral circuit 32, a RAM 33, a storage device 34, and a bus 35. The bus 35 connects the execution device 31, the peripheral circuit 32, RAM 33, the storage device 34, and the plurality of terminals 40 to each other in a communicable manner.

The execution device 31 performs information processing by executing various programs stored in the storage device 34. The peripheral circuit 32 includes a circuit that generates a clock signal that defines an internal operation, a power supply circuit, a reset circuit, and the like. RAM 33 stores data generated in association with the operation of the execution device 31. The storage device 34 stores control program PR related to the masking process and the canceling process of the electronic control device 30 executed by the execution device 31. The storage device 34 stores detected state data SI indicating a state of each of the plurality of terminals 40. The detected state data SI indicates that each of the plurality of terminals 40 is in an abnormal state or in a normal state that is not in an abnormal state. The abnormal state is a state in which the reception of the terminal 40 satisfies the abnormal condition AC. In the present embodiment, the execution device 31 is an execution unit, and the storage device 34 is a storage unit.

The execution device 31 can set the state of the electronic control device 30 to a sleep state and a wake-up state. In the wake-up state, the electronic control device 30 consumes more power supplied from the auxiliary battery 24 than in the sleep state.

When the terminal 40 receives the wake-up signal WS when the electronic control device 30 is in the sleep state, the execution device 31 changes the state of the electronic control device 30 from the sleep state to the wake-up state. When the terminal 40 receives the wake-up signal WS when the electronic control device 30 is in the wake-up state, the execution device 31 continues the state of the electronic control device 30 in the wake-up state. When the electronic control device 30 is in the wake-up state and the terminal 40 does not receive the wake-up signal WS for a predetermined period of time, the execution device 31 puts the state of the electronic control device 30 from the wake-up state to the sleep state. Series of processes, including masking The execution device 31 repeatedly executes the process of the control-program PR at a predetermined cycle.

Figure 2:
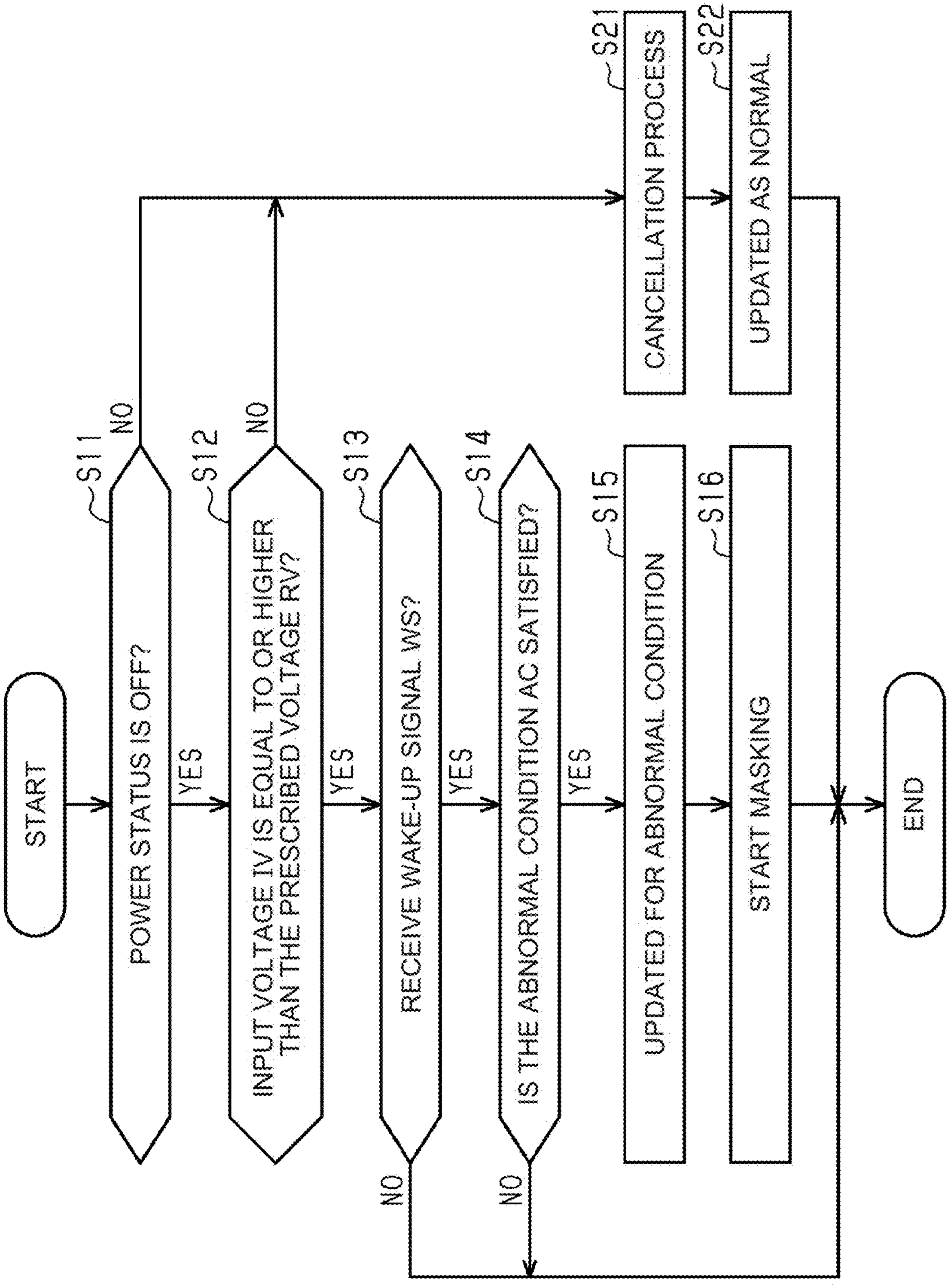
FIG. 2 is a flowchart illustrating a series of processes including a mask process and a cancel process.

As illustrated in FIG. 2, when the execution of the control-program PR is started, the execution device 31 first performs a S11 process. In S11, the execution device 31 determines whether or not the power state of the vehicles 10 is an off-state. Specifically, when the latest request acquired from the power switch 21 is the ON request DN, the execution device 31 determines that the power state of the vehicles 10 is the ON state. On the other hand, when the latest request acquired from the power switch 21 is the off request DF, the execution device 31 determines that the power state of the vehicles 10 is the off state. When the power supply state of the vehicle 10 is in the off state (S11: YES), the execution device 31 advances the process to S12.

In S12, the execution device 31 determines whether or not the input voltage IV from the auxiliary battery 24 is equal to or higher than the prescribed voltage RV. The prescribed voltage RV is determined in advance as a minimum required voltage for determining whether or not an abnormal condition AC to be described later is satisfied and for normally executing the masking process by testing or simulating. When the input voltage IV is equal to or higher than the prescribed voltage RV (S12: YES), the execution device 31 advances the process to S13.

In S13, the execution device 31 determines whether any of the plurality of terminals 40 has received the wake-up WS. When none of the plurality of terminals 40 has received the wake-up signal WS for a prescribed period (S13: NO), the execution device 31 ends the series of processes of this time. On the other hand, when any one of the plurality of terminals 40 receives the wake-up signal WS (S13: YES), the execution device 31 advances the process to S14.

In S14, the execution device 31 determines whether the reception of the wake-up signal WS by the terminal 40 satisfies a predetermined abnormal condition AC. The abnormal condition AC is, for example, receiving a wake-up signal WS of a format that differs from a predetermined format. Also, for example, the abnormal condition AC is that the interval at which the wake-up signal WS is received is shorter than a predetermined minimal interval. Further, for example, the abnormal condition AC is to receive a wake-up signal WS of a predetermined number of times or more in a predetermined period. When the reception of the wake-up signal WS by all the terminals 40 does not satisfy the abnormal condition AC (S14: NO), the execution device 31 ends the series of processes at this time.

On the other hand, when the reception of the wake-up signal WS by the terminal 40 satisfies the abnormal condition AC (S14: YES), the execution device 31 advances the process to S15. In S15, the execution device 31 updates the detected state information SI to a state indicating that the detected state of the terminal 40 that has received the wake-up signal WS is an abnormal state. Thereafter, the execution device 31 advances the process to S16.

In S16, the execution device 31 performs a masking process. In the masking process, the execution device 31 sets the terminal 40 that has received the wake-up signal WS determined to be in the abnormal state to a state in which the wake-up signal WS to be received is invalidated. When the wake-up signal WS is disabled, the terminal 40 does not detect the wake-up signal WS. Accordingly, the execution device 31 does not set the state of the electronic control device 30 to the wake-up state based on the wake-up signal WS received by the masked terminal 40. Thereafter, the execution device 31 ends the series of processes of this time.

When the power supply state of the vehicle 10 is in the on-state (S11: NO) or when the input voltage IV is less than the prescribed voltage RV (S12: NO), the execution device 31 advances the process to S21.

In S21, the execution device 31 executes a releasing process of releasing the masking process. In the cancellation process, the execution device 31 returns to the status in which the wake-up signal WS to be received is enabled for all the terminals 40. Accordingly, the execution device 31 returns the terminal 40 in a state in which the wake-up signal WS received by the masking process is disabled to a state in which the wake-up signal WS to be received is enabled. Note that the execution device 31 keeps the terminal 40 that has not been subjected to the masking process in a condition in which the wake-up signal WS to be received is enabled. In this way, in the cancellation processing, the execution device 31 cancels the masked mask state. Thereafter, the execution device 31 advances the process to S22.

In S22, the execution device 31 updates the detected state data SI for all the terminals 40 to a state indicating a normal state. Accordingly, the execution device 31 updates the detected state information SI from the state indicating the abnormal state to the state indicating the normal state with respect to the terminal 40 whose masking process has been cancelled by S21 cancellation process. Further, the execution device 31 keeps the terminal 40 that has not been masked prior to S21 in a state indicating that the detected state data SI is in a normal state. That is, the execution device 31 clears the abnormal state for all the terminals 40 when performing the cancellation process. Thereafter, the execution device 31 ends the series of processes of this time.

Operations of Embodiment

According to the above-described embodiment, when the power supply state of the vehicle 10 is in the off state, the drive battery 23 does not supply power to the auxiliary battery 24. Therefore, when the vehicle 10 is in the off state, the electronic control device 30 consumes the electric power stored in the auxiliary battery 24, thereby reducing the electric power stored in the auxiliary battery 24. On the other hand, when the electronic control device 30 is in the sleep state, since the power consumption is smaller than that in the wake-up state, the power stored in the auxiliary battery 24 is suppressed from being excessively reduced.

When the electronic control device 30 in the sleep state receives the wake-up signal WS, the wake-up state is established, so that the amount of power consumed is larger than that in the sleep state, so that the amount of power stored in the auxiliary battery 24 is likely to be reduced. Further, when the electronic control device 30 in the wake-up state continues to receive the wake-up signal WS, the electronic control device cannot enter the sleep state. Therefore, as compared with the case where the battery is in the sleep state, the amount of power consumed increases, and thus the amount of power stored in the auxiliary battery 24 tends to decrease.

Effects of Embodiment (1) According to the above-described embodiment, the condition under which the execution device 31 performs the release processing is that the power state of the vehicle 10 is changed from the off state to the on state. When the power supply state of the vehicle 10 is in the on state, electric power is supplied from the drive battery 23 to the auxiliary battery 24. Therefore, by not performing the masking process, even if the state of the electronic control device 30 becomes the wake-up state based on the wake-up signal WS, the electric power stored in the auxiliary battery 24 is less likely to be reduced. As described above, the execution device 31 of the above-described embodiment performs the cancellation processing at a timing at which the electric power starts to be stored in the auxiliary battery 24. As a result, it is possible to prevent the function of the electronic control device 30 from being excessively restricted due to the fact that the electronic control device 30 does not enter the wake-up state.

(2) According to the above-described embodiment, the execution device 31 performs the cancellation process when the input voltage IV becomes less than the prescribed voltage RV. When the input voltage IV becomes less than the prescribed voltage RV, the electronic control device 30 may not be able to normally perform the determination and the masking process of the abnormal condition AC. Therefore, when the input voltage IV becomes less than the prescribed voltage RV, it is possible to prevent the electronic control device 30 from determining and masking an unintended abnormal condition AC.

(3) According to the above-described embodiment, the execution device 31 performs a masking process on the terminal 40 that has received the wake-up signal WS among the plurality of terminals 40. That is, by not performing the mask processing on the terminal 40 that has not received the wake-up signal WS, it is possible to suppress excessive power consumption by the mask processing.

(4) According to the above-described embodiment, the storage device 34 stores the detected-state-information SI. When performing the masking process in S16, the execution device 31 updates the detected state data SI of the terminal 40 for performing the masking process in a state indicating an abnormal state by S15 process. After that, when performing the release process, the execution device 31 updates the detected state data SI in a state indicating a normal state. Therefore, the execution device 31 can grasp whether or not the state of the terminal 40 is an abnormal state by referring to the detected state information SI of the storage device 34.

Other Embodiments

The present embodiment can be realized with the following modifications. The present embodiment and the following modifications can be combined with each other within a technically consistent range to be realized.

The terminal 40 only needs to receive the wake-up signal WS from the outside of the electronic control device 30, and the transmitting source is not limited to the exemplary embodiment.

The associated switch 51, the associated sensor 52, and the associated device 53 may provide a wake-up signal WS to the electronic control device 30. The association between the associated switch 51 and the electronic control device 30 may be related in that it is the source and the destination of the wake-up signal WS. The same applies to the related sensor 52 and the related device 53.

The execution device 31 may perform S15 process simultaneously with S16 process or after S16 process. Also in these cases, the execution device 31 executes S15 process when performing the masking process.

The execution device 31 may perform S22 process prior to S21 process or at the same time as S21 process. Also in these cases, the execution device 31 executes S22 process when performing the cancellation process.

The execution device 31 may not perform the cancellation process when the vehicle 10 is a predetermined vehicle. Specifically, the storage device 34 stores information indicating the type of the vehicle 10. The prescribed vehicle is a vehicle 10 of a predetermined type. In this case, the execution device 31 may determine whether or not to execute the cancellation process by referring to the information indicating the type of the vehicle 10 stored in the storage device 34. That is, in this case, when the type of the vehicle 10 is the type of the prescribed vehicle, the execution device 31 does not execute the activation process. On the other hand, the execution device 31 executes the cancellation process when the type of the vehicle 10 is not the type of the prescribed vehicle. In other words, the execution device 31 may execute the cancellation process on a further condition that the type of the vehicle 10 is not the type of the prescribed vehicle. According to this, by setting the type of the vehicle 10 that does not perform the release processing in advance, it is possible to avoid the release processing from being performed on the vehicle 10.

Specifically, the type of the vehicle 10 may be a destination, a drive type, a mounting system, position information, and a vehicle state. The destination is, for example, a country or a region in which the vehicle 10 is sold. The drive type is the type of the vehicle 10 depending on the type of the drive source. The driving types are, for example, engine-driven vehicles, hybrid electric vehicle, plug-in hybrid electric vehicle, electrified vehicle, and fuel cell electrified vehicle. The mounting system is, for example, an electronic door latch, a power slide, a power back door, or an electric slide roof. The position information is, for example, longitude, latitude, altitude, or azimuth. The vehicle state is, for example, the remaining battery level, the number of days elapsed after the battery replacement, the shift position, and the parking brake state.

The execution device 31 may not update the detected state data SI to the normal state when performing the cancellation process. That is, the execution device 31 may only temporarily perform the cancellation process, and the detected state data SI may remain in a state indicating an abnormal state. As described above, the execution device 31 may determine whether or not to update the detected state data SI to the normal state when performing the cancellation process according to the type of the vehicle 10.

The storage device 34 may not store the detected-state-information SI. In this instance, the execution device 31 may omit S15 and S22 processes.

The determination of the power supply state of the vehicle 10 is not limited to the example of the above-described embodiment. For example, the execution device 31 may determine that the power supply state of the vehicle 10 is the ON state or the OFF state by monitoring the driving state of the drive device 22.

When the input voltage IV is less than the prescribed voltage RV (S12: NO), the execution device 31 may not perform the cancellation process. After making a negative determination in S12, the execution device 31 may terminate the current series of processes.

Further, even if the input voltage IV is less than the prescribed voltage RV, the execution device 31 may determine whether or not the abnormal condition AC is satisfied and perform a masking process. That is, the execution device 31 may omit the processing of S12 and execute the processing of S13 and S14 regardless of the inputted-voltage IV.

The battery that supplies power to the electronic control device 30 is not limited to the auxiliary battery 24. The battery may supply the electric power stored when the power supply state of the vehicle 10 is in the on state to the electronic control device 30 when the power supply state of the vehicle 10 is in the off state.

The drive device 22 may be an engine only or a motor only. That is, the vehicle 10 may be the vehicle 10 driven only by the engine, or may be the vehicle 10 driven only by the motor.

What is claimed is:

1. An electronic control device for a vehicle, the electronic control device being mounted on the vehicle and operable by consuming, when a power supply state of the vehicle is an off state, electric power stored in a battery when the power supply state is an on state, the electronic control device comprising a terminal that is able to receive from outside a wake-up signal indicating a request to bring the electronic control device from a sleep state into a wake-up state in which a greater amount of the electric power is consumed than in the sleep state, the electronic control device further comprising an execution unit configured to perform:

a starting process of bringing the electronic control device into the wake-up state based on the wake-up signal received by the terminal;

a masking process of not bringing the electronic control device into the wake-up state based on the wake-up signal received by the terminal when the power supply state is the off state and a voltage input to the electronic control device is equal to or more than a prescribed voltage determined in advance, when reception of the wake-up signal by the terminal satisfies an abnormal condition determined in advance; and a canceling process of canceling the masking process when the power supply state is brought from the off state into the on state after the masking process.

2. The electronic control device according to claim 1, wherein the execution unit performs the canceling process when the voltage input to the electronic control device becomes less than the prescribed voltage after the masking process.

3. The electronic control device according to claim 1, comprising a plurality of terminals, wherein the execution unit performs the masking process for a terminal that has received the wake-up signal.

4. The electronic control device according to claim 3, further comprising a storage unit that stores detected state information indicating whether reception by a terminal among the terminals that has received the wake-up signal is in an abnormal state that is a state satisfying the abnormal condition, wherein the execution unit is configured to:

update the detected state information for a terminal for which the masking process is performed with a state indicating the abnormal state when performing the masking process; and update the detected state information with a state not indicating the abnormal state when performing the canceling process.

* * * * *